US011365341B2

(12) United States Patent
Patil et al.

(10) Patent No.: US 11,365,341 B2
(45) Date of Patent: Jun. 21, 2022

(54) METHODS AND COMPOSITIONS FOR MITIGATING FLUID LOSS FROM WELL BALLOONING

(71) Applicant: Halliburton Energy Services, Inc., Houston, TX (US)

(72) Inventors: Sandip Prabhakar Patil, Pune (IN); Kyriacos Agapiou, Houston, TX (US); Paul Michael Osborne, Denver, CO (US); Ganesh Shriniwas Pangu, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 40 days.

(21) Appl. No.: 16/887,212

(22) Filed: May 29, 2020

(65) Prior Publication Data

US 2021/0371722 A1 Dec. 2, 2021

(51) Int. Cl.
*C09K 8/50* (2006.01)
*C09K 8/504* (2006.01)
*C09K 8/508* (2006.01)

(52) U.S. Cl.
CPC .............. *C09K 8/501* (2013.01); *C09K 8/508* (2013.01); *C09K 8/5045* (2013.01)

(58) Field of Classification Search
CPC . C09K 8/40; C09K 8/42; C09K 8/422; C09K 8/424; C09K 8/428; C09K 8/50; C09K 8/501; C09K 8/504; C09K 8/5045; C09K 8/506; C09K 8/508; C09K 8/516
See application file for complete search history.

(56) References Cited

U.S. PATENT DOCUMENTS

| | | | | | |
|---|---|---|---|---|---|
| 2,754,265 | A | * | 7/1956 | Hoeppel | C09K 8/32 507/137 |
| 3,486,559 | A | * | 12/1969 | Fast | E21B 33/138 166/252.1 |
| 6,220,087 | B1 | * | 4/2001 | Hache | E21B 47/06 73/152.46 |
| 6,926,081 | B2 | * | 8/2005 | Sweatman | E21B 21/003 166/250.08 |
| 10,550,652 | B2 | * | 2/2020 | Milner | E21B 21/08 |
| 2004/0124009 | A1 | * | 7/2004 | Hoteit | G06N 7/005 175/48 |
| 2010/0032160 | A1 | * | 2/2010 | Wilson | C09K 8/516 166/282 |

(Continued)

OTHER PUBLICATIONS

Oil and Gas Glossary, Equivalent Circulating Density definition, retrieved Aug. 31, 2021 from https://iadclexicon.org/equivalent-circulating-density-ecd/ (Year: 2017).*

(Continued)

*Primary Examiner* — Angela M DiTrani Leff
(74) *Attorney, Agent, or Firm* — Conley Rose, P.C.; Rodney B. Carroll

(57) ABSTRACT

A method of servicing a wellbore in a formation comprising circulating in the wellbore a wellbore servicing fluid wherein an equivalent circulating density of the wellbore servicing fluid is from about 1% to about 15% greater than a fracture pressure of the formation, and introducing to the wellbore a balloon-inhibiting tunable spacer (BITS) fluid wherein at least about 1 wt. % of the BITS fluid is retained by the formation.

20 Claims, 2 Drawing Sheets

(56) References Cited

U.S. PATENT DOCUMENTS

| | | | |
|---|---|---|---|
| 2011/0067923 A1* | 3/2011 | Leuchtenberg | E21B 21/08 175/57 |
| 2013/0298662 A1* | 11/2013 | Jamison | G01N 33/2823 73/152.18 |
| 2013/0299241 A1* | 11/2013 | Alberty | E21B 47/10 175/50 |
| 2013/0299242 A1* | 11/2013 | Veeningen | E21B 47/113 702/7 |
| 2013/0303412 A1* | 11/2013 | Luyster | C09K 8/12 507/236 |
| 2014/0262281 A1* | 9/2014 | Kulkarni | C09K 8/02 166/305.1 |
| 2014/0291023 A1* | 10/2014 | Edbury | E21B 21/08 175/24 |
| 2014/0352969 A1 | 12/2014 | Chung et al. | |
| 2015/0308209 A1* | 10/2015 | Karimi | E21B 21/003 166/280.1 |
| 2016/0222274 A1 | 8/2016 | Hoskins | |
| 2016/0257869 A1 | 9/2016 | Kulkarni et al. | |
| 2017/0081931 A1* | 3/2017 | Milner | E21B 21/08 |
| 2017/0145822 A1* | 5/2017 | Rowe | E21B 49/003 |
| 2017/0328200 A1* | 11/2017 | Forstner | E21B 49/005 |
| 2021/0325562 A1* | 10/2021 | Salazar David | E21B 21/08 |

OTHER PUBLICATIONS

Golwalkar et al., Exploratory Drilling in Severely Ballooning Formation—Use of Best Drilling Practices and Real Time Monitoring for Low Cost Mitigation, 2016, International Petroleum Technology Conference (Year: 2016).*

Foreign Communication from Related Application—International Search Report and Written Opinion of the International Searching Authority, International Application No. PCT/US2020/035899, dated Feb. 24, 2021, 9 pages.

* cited by examiner

METHODS AND COMPOSITIONS FOR MITIGATING FLUID LOSS FROM WELL BALLOONING

FIELD

This disclosure relates to wellbore servicing fluids, wellbore servicing compositions and methods of making and using same to service a wellbore. More specifically, it relates to compositions and methods for mitigating fluid loss due to well ballooning.

BACKGROUND

The drilling of a wellbore is typically carried out using a steel pipe known as a drill string with a drill bit on the lowermost end. As drilling progresses, a flow of mud is used to carry the debris created by the drilling process out of the wellbore. Mud is pumped through an inlet line down the drill string to pass through the drill bit, and returns to the surface via the annular space between the outer diameter of the drill string and the wellbore (generally referred to as the annulus). Mud is a very broad drilling term, and in this context it is used to describe any fluid or fluid mixture used during drilling such as heavily weighted mixtures of oil or water with solid particles.

The mud flow also serves to cool the drill bit, and in conventional overbalanced drilling, the density of the mud is selected so that it produces a pressure at the bottom of the wellbore which is high enough to counter balance the pressure of fluids in the formation ("the formation pore pressure"). This substantially prevents inflow of fluids from formations penetrated by the wellbore entering into the wellbore. During oil and gas well drilling, the equivalent circulating density (ECD) may be adjusted to balance pore pressure and fracture gradient at all or most depths.

The ECD refers to the pressure-exerted downhole by the fluid (e.g., drilling mud), choke pressure, transported cuttings and the hydraulics losses in the annulus. The ECD can be calculated at any vertical depth and is a pressure expressed in terms of a fluid density that is required to get an equivalent pressure at a given depth. This is distinguished from the drilling fluid density that is a physical property of the drilling fluid slurry and refers to the mass per unit volume of a drilling fluid, synonymous with mud weight.

While pumping fluids (such as drilling muds), the well bore pressures are typically higher than when the pumps are off. This pressure increase may be due to the friction of the drilling fluid as it flows up the well. The pressure fluctuations in the wellbore that are due to pumps-on versus pumps-off events may cause over pressurization at certain zones in the well such that small fractures are opened and fluid can be forced into these fractures at the higher pumps-on pressures. When the pumps are turned off, the pressure drops and the formation can potentially force fluids back into the well. The result can be the formation experiencing a cycle of transient loss of fluids while drilling followed by fluid gains when the pumps are turned off. Herein, this cyclic series of fluid gains and losses by the formation is referred to as ballooning or breathing.

Ballooning can be characterized as a formation anomaly whereby a pumped fluids' ECD forces drilling fluid from the wellbore into small fractures, which open only enough to contain fluid, but not enough to permanently fracture the formation. When the fluids cease to be pumped and the circulating friction pressure (i.e., ECD) is lost, the overburden of the rock forces the contained fluid back into the wellbore.

Ballooning of the well may adversely affect the composition of wellbore servicing fluids introduced after the generation of these small fractures. For example, after generation of these fractures and a pumps-off event, a wellbore servicing fluid (WSF) introduced to the formation (e.g., a cementitious fluid used in a primary or secondary cementing operation) may encounter other fluids that have flowed back into the reservoir which could negatively impact the WSF through effects such as dilution or contamination.

An ongoing need exists for methods and compositions for mitigating the effects of well-ballooning on wellbore servicing fluids and wellbore servicing operations.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1A:
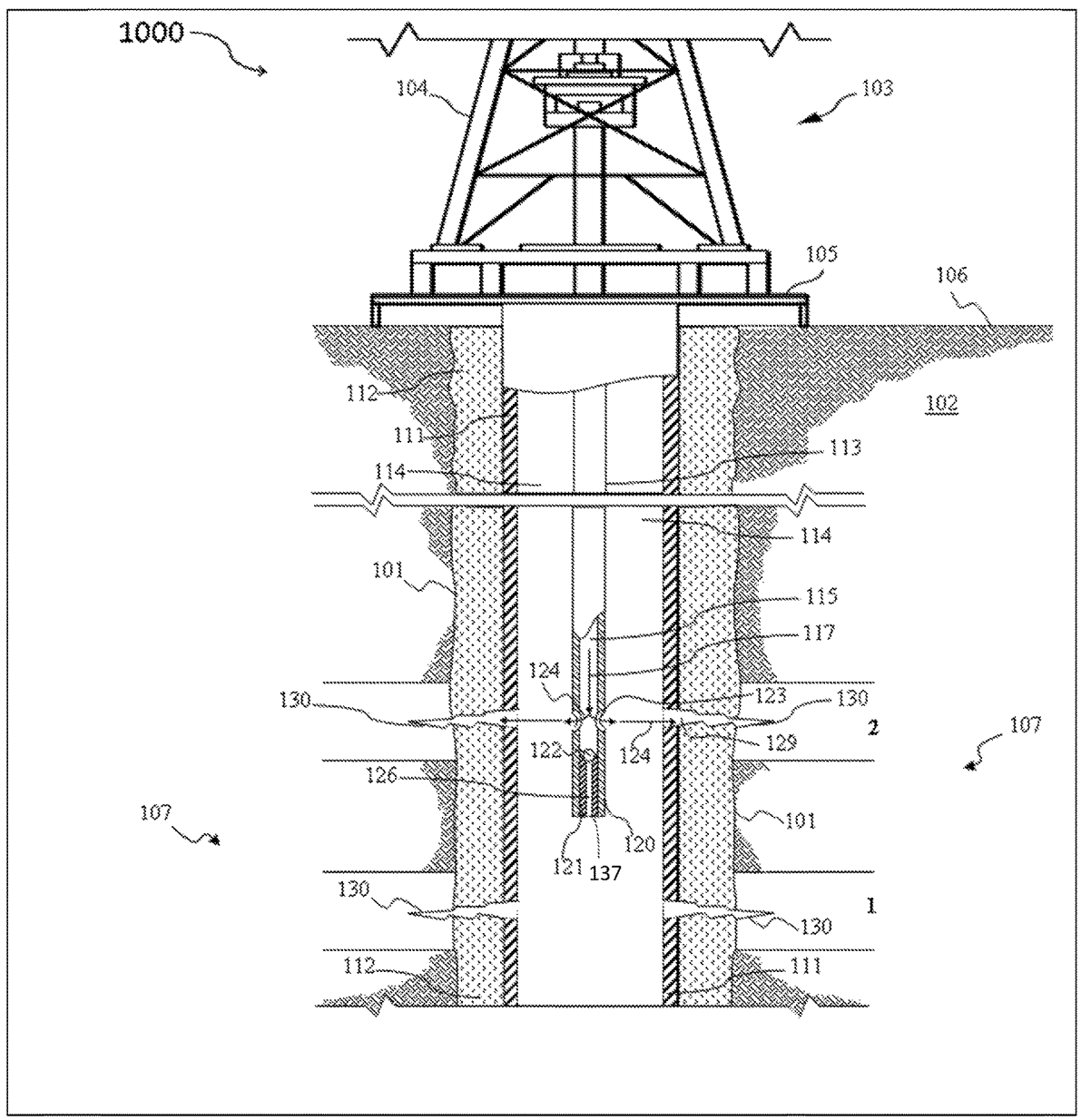
FIGS. 1A and 1B are partial cut-away views of embodiments of an environment associated with a wellbore servicing operation employing a wellbore servicing fluid of the type disclosed herein and illustrating a subterranean formation stimulation operation.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are wellbore servicing compositions and methods of using same. In embodiments, a method of the present disclosure comprises introducing a balloon-inhibiting tunable spacer (BITS) into a wellbore following drilling but prior to introduction of another wellbore servicing fluid to the formation.

In the drawings and description that follow, like parts are typically marked throughout the specification and drawings with the same reference numerals, respectively. In addition, similar reference numerals may refer to similar components in different embodiments disclosed herein. The drawing figures are not necessarily to scale. Certain features of the presently disclosed subject matter may be shown exaggerated in scale or in somewhat schematic form and some details of conventional elements may not be shown in the interest of clarity and conciseness. The presently disclosed subject matter is susceptible to embodiments of different forms. Specific embodiments are described in detail and are shown in the drawings, with the understanding that the present disclosure is not intended to limit the disclosed subject matter to the embodiments illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "up-hole," "upstream," or other like terms shall be construed as generally from the formation toward the surface or toward the surface of a body of water; likewise, use of "down," "lower," "downward," "downhole," "downstream," or other like terms shall be construed as generally into the formation away from the surface or away from the surface of a body of water, regardless of the wellbore orientation. Use of any one or more of the foregoing terms shall not be construed as denoting positions along a perfectly vertical axis.

Unless otherwise specified, use of the term "subterranean formation" shall be construed as encompassing both areas below exposed earth and areas below earth covered by water such as ocean or fresh water.

Figure 1B:
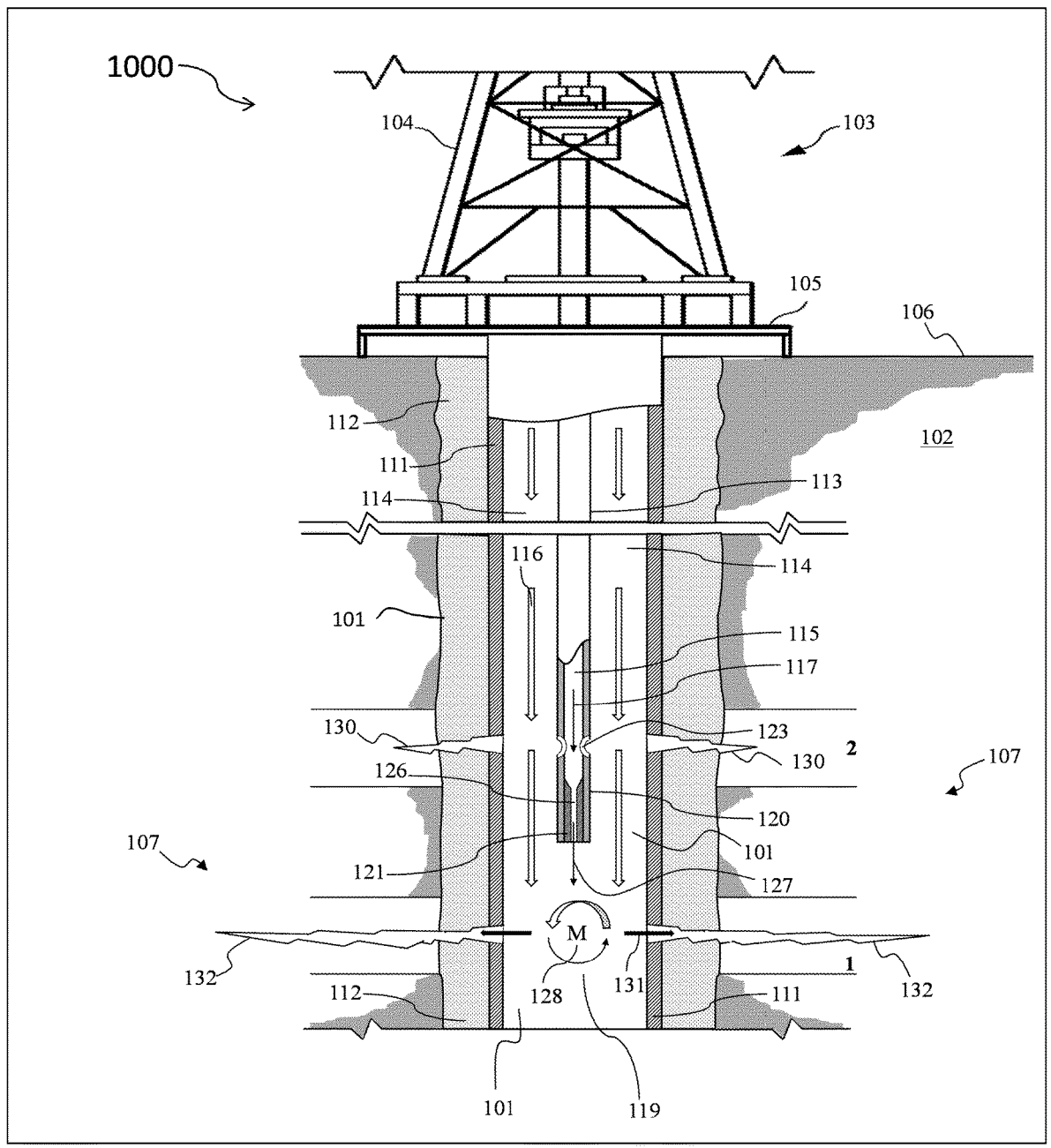

Referring to FIGS. 1A and 1B, an embodiment of an operating environment in which a wellbore serving fluid of the type disclosed herein and associated methods may be employed is illustrated. It is noted that although some of the figures may exemplify horizontal or vertical wellbores, the principles of the methods, apparatuses, and systems disclosed herein may be similarly applicable to horizontal wellbore configurations, conventional vertical wellbore configurations, and combinations thereof. Therefore, the horizontal or vertical nature of any figure is not to be construed as limiting the wellbore to any particular configuration.

Referring to the embodiment of FIGS. 1A and 1B, the operating environment generally includes a wellbore 101 that penetrates a subterranean formation 102 for the purpose of recovering hydrocarbons, storing hydrocarbons, disposing of carbon dioxide, or the like. The wellbore 101 may be drilled into the subterranean formation 102 using any suitable drilling technique. In one or more embodiments, a drilling or servicing rig 103 includes a derrick 104 with a rig floor 105 through which a work string (e.g., a drill string, a tool string, a segmented tubing string, a jointed tubing string, a coiled tubing string, or any other suitable conveyance, or combinations thereof) generally defining an axial flowbore may be positioned within or partially within the wellbore 101. In one or more embodiments, such a work string may include two or more concentrically positioned strings of pipe or tubing (e.g., a first work string may be positioned within a second work string). The drilling or servicing rig 103 may be conventional and may include a motor driven winch and other associated equipment for lowering the work string into the wellbore 101. Alternatively, a mobile workover rig, a wellbore servicing unit (e.g., coiled tubing units), or the like may be used to lower the work string into the wellbore 101. In such an embodiment, the work string may be utilized in drilling, stimulating, completing, or otherwise servicing the wellbore.

The wellbore 101 may extend substantially vertically away from the earth's surface 106 over a vertical wellbore portion, or may deviate at any angle from the earth's surface 106 over a deviated or horizontal wellbore portion. In alternative operating environments, portions or substantially all of the wellbore 101 may be vertical, deviated, horizontal, and/or curved and such wellbore may be cased, uncased, or combinations thereof.

Referring again to FIGS. 1A and 1B, in one or more embodiments, the wellbore 101 may be at least partially cased with a casing string 111 generally defining an axial flowbore, alternatively the wellbore 101 may be at least partially cased with a liner. In an alternative embodiment, at least a portion of a wellbore, like wellbore 101, may remain uncased. The casing string 111 may be secured into position within the wellbore 101 in a conventional manner with cement 112, alternatively, the casing string 111 may be partially cemented within the wellbore, or alternatively, the casing string may be uncemented. For example, in an alternative embodiment, a portion of the wellbore 101 may remain uncemented, but may employ one or more packers (e.g., mechanical packers or swellable packers) to secure the casing string 111 within the wellbore 101 and/or to isolate two or more adjacent portions, zones, or stages within the wellbore 101. In one or more embodiments, where the casing string includes a liner, the liner may be positioned within a portion of the wellbore 101, for example, lowered into the wellbore 101 suspended from the work string. In such an embodiment, the liner may be suspended from the work string by a liner hanger or the like. Such a liner hanger may include any suitable type or configuration of liner hanger.

In one or more embodiments, a casing string or liner, such as casing string 111, may generally include a pipe or tubular, which may include a plurality of joints or sections, and which may be placed within the wellbore for the purpose of maintaining formation integrity, preventing collapse of the wellbore, controlling formation fluids, preventing unwanted losses of fluid to the formation, or the like. As such, the casing string 111 may be configured to prevent unintended fluid communication between the axial flowbore and the formation 102.

While the exemplary operating environment depicted in FIGS. 1A and 1B refers to a stationary drilling rig 103 for accessing a land-based wellbore 101, it will be readily appreciated that mobile workover rigs, wellbore servicing units (e.g., coiled tubing units), and the like may be used for accessing the wellbore 101. Referring to the embodiment of FIGS. 1A and 1B, the wellbore 101 may have been drilled into the subterranean formation 102 as previously described herein.

In one or more embodiments, the wellbore may include two or more wellbore tubulars (e.g., casing strings, work strings, etc.) at least a portion of a first wellbore tubular being concentrically positioned within at least a portion of a second wellbore tubular. Referring to the embodiment of FIGS. 1A and 1B, the wellbore 101 includes a tubular work string 113 positioned within the casing string 111. In one or more embodiments, the tubular work string 113 includes a coiled tubing, a stick pipe, an open ended production tubing, a casing string, a liner, a production string, a completion string, a drill string, a tool string, a tubing string, a segmented tubing string, a jointed tubing string, or another suitable type of string, or combinations thereof.

In one or more embodiments, the tubular work string 113 includes at least a portion of a servicing tool that may be located at the end of the tubular work string 113 that is positioned in the proximity of the producing zone 107. In such embodiment, the end of the tubular work string 113 may be configured to deliver fluids with different properties, i.e., different viscosities, different flow rates, etc.

The wellbore 101 configuration comprising a tubular work string 113 positioned within the casing string 111 leads to two distinct flowpaths (i.e., annular flowpath 114 and tubular flowpaths 115) that are isolated from each other until they reach a portion of the wellbore proximate the producing zone 107. In one or more embodiments, the annular flowpath 114 includes the annular space between the tubular work string 113 and the casing string 111 (e.g., as shown by annular flowpath arrow 116). In one or more embodiments, the tubular flowpath 115 includes the flow space within the tubular work string 113 (e.g., as shown by tubular flowpath arrow 117).

Referring to the embodiment of FIGS. 1A and 1B, a fluid (e.g., a wellbore servicing fluid comprising a coated proppant as described herein) may be introduced into the annular flowpath 114 using any suitable methodology (e.g., pumping). A fluid present in the annular flowpath 114 may be referred to as an annular fluid. In one or more embodiments, the annular fluid flowpath may follow annular flowpath arrow 116.

Referring to the embodiment of FIGS. 1A and 1B, a fluid may be introduced into the tubular flowpath 115 using any suitable methodology (e.g., pumping). A fluid present in the tubular flowpath 115 may be referred to as a tubular fluid. In one or more embodiments, the tubular fluid flowpath may follow tubular flowpath arrow 117.

In some embodiments, a flowpath into the formation may be established by providing one or more perforations and/or perforation clusters (e.g., a plurality of associated or closely-positioned perforations) in the casing string 111. In one or more embodiments, the casing, cement sheath, and/or surrounding formation are perforated to provide a flowpath and associated route of fluid communication from the wellbore into the surrounding formation. Perforations generally refer to openings extending through the walls of a casing and/or liner, through the cement sheath surrounding the casing or liner (when present), and, in some embodiments, into the formation.

Perforations may be formed using any suitable methodology or apparatus. For example, In one or more embodiments, the perforations may be formed by a fluid jetting apparatus (e.g., a hydrajetting tool). Additionally or alternatively, perforations may be provided via explosive charges such as shaped charges.

Referring to FIGS. 1A and 1B, the end of the tubular work string 113 includes an embodiment of a fluid jetting apparatus 120 and is illustrated in operation within the wellbore 101. In the embodiment of FIGS. 1A and 1B, the fluid jetting apparatus 120 is selectively configurable to deliver a relatively low-volume, relatively high-pressure fluid stream (e.g., as would be suitable for a perforating operation, as seen in FIG. 1A) or to deliver a relatively high-volume, relatively low-pressure fluid stream (e.g., as would be suitable for a fracturing operation, as seen in FIG. 1B).

In the embodiment of FIG. 1A, the fluid jetting apparatus 120 is configured for a perforating operation, for example, by introducing an obturating member 122 (e.g., via a ball, foam dart, mechanical dart, etc.) into the tubular work string 113 and forward-circulating the obturating member 122 to engage a seat or baffle 121 within the fluid jetting apparatus 120 and thereby configure the fluid jetting apparatus 120 for the perforating operation (e.g., by providing a route of fluid communication via one or more fluid jetting orifices 123 and by obscuring a route of fluid communication via one or more relatively high-volume fracturing ports 137). Upon engaging the seat 121, such an obturating member 122 may substantially restrict or impede the passage of fluid from one side of the obturating member to the other. The fluid jetting apparatus 120 may be positioned proximate and/or substantially adjacent to the formation zone into which a perforation is to be introduced (e.g., fracturing interval 2, as illustrated in the embodiment of FIG. 1A) and a suitable perforating fluid may be pumped via the tubular flowpath 115 of the tubular work string 113 to the fluid jetting apparatus 120. In various embodiments, the tubular fluid comprising a perforating fluid may include a particulate and/or abrasive material (e.g., proppant, sand, steel fines, glass particles, and the like). The perforating fluid may be pumped at rate and/or pressure such that the fluid is emitted from the fluid jetting apparatus 120 via the fluid jetting orifices 123 (e.g., jets, nozzles, erodible nozzles, or the like), as shown by tubular flowpath arrows 124, at a rate and/or pressure sufficient to erode, abrade, and/or degrade walls of the adjacent and/or proximate casing string 111, and/or the cement sheath 112 surrounding the casing string 111, and thereby forming one or more perforations 130. The perforating fluid may be returned to the surface via the annular flowpath 114.

In an alternative embodiment, the perforations 130 may be formed by the operation of a perforating gun. Such a perforating gun may be configured to selectively detonate one or more explosive charges thereby penetrating the walls of the casing string 113 or liner and/or cement 112 and so as to create the perforation 130. A suitable perforating gun may be conveyed into position within the wellbore via a workstring (e.g., a coiled tubing string), a wireline, a tractor, or by any other suitable means of conveyance. In such an embodiment, the perforating gun may be lowered into the wellbore, for example, suspended from a work string like the tubular work string 113 or a wireline, and actuated (e.g., fired) to form perforations. In still another embodiment, a casing string 111 or liner may be perforated prior to placement within a wellbore 101.

In an alternative embodiment, a perforation includes a casing window and/or casing door assembly, for example having actuatable windows (e.g., sliding sleeves) that are selectively configurable to provide a route of fluid communication from the interior of the wellbore to the surrounding formation. In such embodiments, the casing string 111 typically is not cemented within the wellbore 101, and the casing string 111 may also include a plurality of packers (e.g., mechanical packers or swellable packers, such as SwellPackers™ swellable packers, commercially available from Halliburton Energy Services, Inc.), typically positioned on the exterior of the casing in the annulus between the casing and the wellbore wall and utilized to secure the casing string 111 within the wellbore 101 and to isolate adjacent fracturing intervals (e.g., fracturing interval 1 from fracturing interval 2, etc.) of the wellbore 101 and/or adjacent formation zones. The casing window assembly may generally refer to an assemblage, which may be incorporated within a casing string or liner, and which may be configurable to provide a route of fluid communication between the axial flowbore of the casing and an exterior of the casing. In one or more embodiments, the casing windows may be activatable and/or deactivatable, for example, such that the casing windows are selectively configurable to allow and/or disallow fluid communication. For example, a casing window assembly may generally include a housing having one or more ports providing a route of fluid communication between the axial flowbore of the casing and an exterior of the casing dependent upon the positioning of a sliding sleeve. The sliding sleeve may be movable, relative to the housing, from a first position (e.g., a closed position), in which the sliding sleeve obstructs the ports, to a second position (e.g., as open position), in which the sliding sleeve does not obstruct the ports. Additionally, in one or more embodiments, the ports may be fitted with a suitable fluid-pressure altering device (e.g., jets, nozzles, erodible nozzles, or the like), for example, such that fluid communication via the fluid-pressure altering device may erode and/or degrade a portion of the formation and/or, when present, a cement sheath surrounding the casing window assembly (e.g., in embodiments where a cement sheath is present).

In various embodiments, the casing windows may be activatable and/or deactivatable by any suitable method or apparatus. For example, in various embodiments, a casing window assembly may be activatable or deactivatable, (e.g., by transitioning the sliding sleeve from the first to the second position or from the second to the first position) via one or more of a mechanical shifting tool, an obturating member (e.g., a ball or dart), a wireline tool, a pressure differential, a rupture disc, a biasing member (e.g., a spring), or combinations thereof. In alternative embodiments, a casing window assembly may be activated and/or deactivated by any suitable method or apparatus. Suitable methods and apparatuses may be appreciated by one of skill in the art upon viewing this disclosure.

Referring to the embodiment of FIG. 1B, when there is no obturating member engaged in the seat 121, the tubular fluid is forced to exit the tubular flowbore 115 via the tubular seat flowbore 126, as shown by tubular flowpath arrow 127. In such embodiment, the tubular fluid will meet the annular fluid in the zone of fluid communication 119, and the two fluids will mix as shown by mixing arrows 128 in FIG. 1B. While in the embodiment of FIG. 1B the tubular fluid is designed to exit the tubular working string 113 via the tubular seat flowbore 126, as shown by the tubular flowpath arrow 127, some tubular fluid might exit the tubular working string 113 via the tubular fluid jetting orifices 123 and mix with the annular fluid adjacent and/or downstream from the orifices 123.

While the embodiments of FIGS. 1A and 1B only display two fracturing intervals in the producing zone 107, the producing zone may include 1, 2, 3, 4, 5, 6, 7, 8, 9, 10, 11, 12, or more fracturing intervals.

Methods of the present disclosure may be employed during wellbore servicing operations. In one or more embodiments, a subterranean operation involves drilling a wellbore in a subterranean formation using a drilling mud. During oil and gas well drilling, the ECD of the drilling mud may be adjusted to balance pore pressure at all or most depths.

In one or more embodiments, a drilling mud for use in the present disclosure has an ECD that is from 1% to about 15% greater than a fracture pressure of the formation. Alternatively, from about 1% to about 10% or alternatively from about 5% to about 10% greater than a fracture pressure of the formation. In such embodiments, the ECD of the drilling mud may range from about 8.5 lb/gal to about 20 lb/gal, alternatively from about 8.5 lb/gal to about 18 lb/gal or alternatively from about 8.5 lb/gal to about 15 lb/gal. The ECD of the drilling mud being greater than a fracture pressure of the formation results in the induction of fractures in the formation. Such fractures may be collectively characterized as a pervious zone.

In embodiments, a method of the present disclosure includes the generation of a pervious zone in a formation by circulation in the wellbore of a wellbore servicing fluid having an ECD in the ranges disclosed herein. A pervious zone as disclosed herein may be characterized by induced fractures that that are the result of weak zones have fracture gradients exceeded by the ECD of the wellbore servicing fluid (e.g., drilling mud).

In one or more embodiments, a formation comprising a pervious zone experiences ballooning. Ballooning, as previously disclosed, refers to a phenomenon whereby circulating friction (i.e., ECD) causes fluid losses at the surface. During well ballooning the formation takes in drilling mud when the pumps are on, but when the pumps stop, the formation returns the fluid. The process is similar to how a balloon holds air then returns it to the atmosphere when reopened.

A pervious zone experiencing ballooning may be characterized by the loss of a wellbore servicing fluid having an ECD in the ranges disclosed herein (e.g., drilling mud) to the formation during circulation of the fluid. Specifically, the pervious zone may be characterized by a behavior wherein during pumps-on there is loss of the wellbore servicing fluid via efflux of fluid from the wellbore to the formation; and the gain of wellbore servicing fluid when circulation is ceased, or during pumps-off, there is an influx of fluid from the formation to the wellbore. In one or more embodiments, this behavior is cyclical such that the efflux and influx of fluid is concomitant with the pumps-on and pumps-off events, respectively.

In one or more embodiments of the present disclosure, the method further comprises servicing the wellbore with a wellbore servicing fluid (WSF) that includes a balloon-inhibiting tunable spacer (BITS) fluid (e.g., placing the WSF-BITS fluid downhole). In one or more embodiments, a WSF-BITS fluid is used to service the wellbore subsequent to introduction of a fluid having an ECD in the range disclosed herein (e.g., a drilling mud) but prior to introduction of another wellbore servicing fluid (e.g., cementitious fluid). In one or more embodiments, a WSF-BITS fluid of the present disclosure is formulated to minimize or eliminate fluid communication between the wellbore and the pervious zone where fluid communication refers to the movement of gas or liquid between the wellbore and formation. Additionally, the WSF-BITS may have specific properties to meet one or more downhole user and/or process goals (e.g., to condition the surface of the pipe).

A volume of WSF-BITS may be introduced to the wellbore and a portion of the WSF-BITS introduced may be lost to the pervious zone. In one or more embodiments, the portion of WSF-BITS lost to the pervious zone at least about 1 volume percent (vol. %) of the total volume of the WSF-BITS introduced to the wellbore; alternatively from about 2 vol. % to about 90 vol. %; or alternatively from about 5 vol. % to about 80 vol. %. In one or more embodiments, the WSF-BITS lost to the pervious zone enters the fractures in the pervious zone and forms a barrier that reduces both the influx of fluid from the wellbore to the pervious zone and the efflux of fluid from the pervious zone to the wellbore (i.e., well ballooning) by at least about 50%, alternatively at least about 75% or alternatively by at least about 90%.

In one or more embodiments, introduction of a WSF-BITS of the type disclosed herein to a wellbore experiencing a ballooning event reduces or eliminates the well ballooning. The reduction or elimination of well-ballooning may be evaluated using any suitable methodology. For example, the reduction or elimination of well-ballooning may be evaluated by (i) shutting the well at the surface and monitoring the well pressure; (ii) stopping the pumping of fluids to the well and monitoring of the return flow rate; (iii) measuring the downhole temperature at the depth of the pervious (flow) zone or (iv) any combination thereof. In one or more embodiments, the method further comprises determining the effect of placement of a volume of WSF-BITS in the wellbore on the extent of well ballooning.

In one or more embodiments, the effect of placement of a volume of WSF-BITS in the wellbore on the extent of well ballooning is determined by shutting the wellbore at the surface and monitoring the well pressure. In such embodiments, a reduction in or elimination of well ballooning is indicated by a well pressure that is about zero.

In one or more embodiments, the effect of placement of a volume of WSF-BITS in the wellbore on the extent of well ballooning is determined by stopping the pumping of fluids to the well and monitoring the rate at which fluid returns to the well (i.e., return flow rate). In such embodiments, a reduction in or elimination of well ballooning is indicated by a return flow rate of about zero.

In one or more embodiments, the effect of placement of a volume of WSF-BITS in the wellbore on the extent of well ballooning is determined by measuring the downhole temperature at the depth of the pervious (flow) zone. In such embodiments, a reduction in or elimination of well ballooning is indicated by a downhole temperature (e.g., BHST) that remains about constant. It is contemplated that absent the influx of fluids during a pumps-off event due to the presence of a BITS in the pervious zone, the temperature of the wellbore remains about constant.

A WSF-BITS of the type disclosed herein is further characterized as being selectively retained by the pervious zone while having minimal impact on the productive zones of the formation. The "productive zones of the formation" refers to any stratum know to contain natural resources in commercial quantities. In one or more embodiments, minimal impact as a result of selective retention by the pervious zone of the BITS is indicated by a regain permeability of from about 50% to about 100%, alternatively from about 75% to about 100% or alternatively greater than about 90%. Herein the regain permeability is the percentage of the initial permeability of formation retained after the WSF-BITS has been disposed in the wellbore. The initial permeability of the formation is a measurement of the formation's ability to transmit fluids that is measured in darcies or millidarcies. It is contemplated that a regain permeability in the disclosed ranges demonstrates that a WSF-BITS of the present disclosure inhibits or prevents formation fluid from entering into the annulus while remaining permeable to natural resources such as oil.

It is contemplated that the pervious zone induced by a wellbore servicing fluid of the type disclosed herein (e.g. drilling with an ECD in the ranges disclosed) includes fractures of sufficient width and flexibility to afford some loss of circulating fluid (e.g., wellbore servicing fluid) to the wellbore during a pumps-on event. It is contemplated that the majority of fractures in the pervious zone are nonproductive as they are insufficient (e.g., not of sufficient depth) to transmit natural resources (e.g., oil) from the formation to the wellbore.

A WSF-BITS of the present disclosure prevents movement of fluid due to the pump-dependent opening and closing of fractures in the pervious zone and creates a barrier to fluid communication between the fractures in the pervious zone of the formation and the wellbore. Additionally, the WSF-BITS may function as a spacer fluid which prevents intermixing of wellbore servicing fluids and facilitates the removal of filter cake and gelled drilling fluid from the walls of the wellbore. For example, a WSF-BITS of the present disclosure may also function to displace a drilling fluid from the annulus, leave the casing and formation water-wet (free of oil), and separate drilling fluids from subsequent wellbore servicing fluids such as cement slurries.

A BITS of the present disclosure may include a particulate material, a multifunctional polymer, a viscosifier, a clay and a chelating agent. In one or more embodiments, a BITS of the type disclosed herein is a component of a wellbore servicing fluid. The BITS may be a component of any wellbore servicing fluid used in servicing a wellbore. In one or more embodiments, the BITS is included in a WSF that includes a weighting agent, a suspending agent, an emulsifier and a base fluid which forms a WSF-BITS.

In one or more embodiments of the present disclosure, the BITS includes a particulate material. The particulate material may include inorganic particles, carbonate-containing particles, polymeric materials, elastomeric materials or any combination thereof. In one or more embodiments, particulate materials suitable for use in the present disclosure have particle size distribution of from about 0.1 microns to about 5 millimeters (mm), alternatively from about 0.5 microns to about 4.5 mm or alternatively from about 1 micron to about 4 mm.

Particulate materials suitable for use in the present disclosure may be characterized by a morphology that is uniform; alternatively nonuniform. Particulate materials of the present disclosure may be characterized by an aspect ratio of from about 1:2000, alternatively from about 5:1800 or alternatively from about 10:1500.

Nonlimiting examples of particulate materials suitable for use in the present disclosure include silica (sand), graded sand, Ottawa sands, Brady sands, Colorado sands; gravels; synthetic organic particles, nylon pellets, high density plastics, polytetrafluoroethylenes, rubbers, resins; ceramics, aluminosilicates; glass; sintered bauxite; quartz; aluminum pellets; ground or crushed shells of nuts, walnuts, pecans, almonds, ivory nuts, brazil nuts, and the like; ground or crushed seed shells of seeds of fruits; ground or crushed seed shells of other plants; crushed fruit pits or processed wood materials, materials derived from woods; graphite, petroleum coke, calcined petroleum coke, rubber particles, coal and any combination thereof.

In one or more embodiments, a particulate material is present in the BITS in an amount of from about 10 weight percent (wt. %) to about 90 wt. % based on the total weight of solids, alternatively from about 15 wt. % to about 85 wt. % or alternatively from about 20 wt. % to about 80 wt. %.

In one or more embodiments of the present disclosure, the BITS includes a multifunctional polymer. The multifunctional polymer may serve several roles in the BITS. For example, the multifunctional polymer may act as a friction reducer. Friction reducers herein refer to materials that reduce energy losses due to turbulence within the well fluid. The multifunctional polymer may also act as rheology modifier that alters the flow behavior of the BITS. In embodiments, the multifunctional polymer also functions as fluid loss control additive.

In one or more embodiments, a multifunctional polymer suitable for use in the BITS includes an anionic polymer, a cationic polymer, a non-ionic polymer, an amphoteric polymer and any combination thereof. In one or more embodiments, the multifunctional polymer is selected from the group consisting of a polyacrylamide, a polyacrylamide derivative, a polyacrylamide co-polymer, a N-N dimethyl-acrylamide-2-acrylamido-2-methylpropanesulfonic acid-acryloylmorpholine terpolymer, N-N dimethylacrylamide-AMPS-vinyl pyrollidone terpolymer, tannin-grafted AMPS, lignite-grafted AMPS-acrylonitrile-acrylamide terpolymer, humate-grafted AMPS-diallyldimethylammonium chloride, AMPS-acrylamide-gelatin based biodegradable polymer, functionalized vinyl derivatives, vinyl phosphonic acid and any combination thereof.

In one or more embodiments, the multifunctional polymer is present in the BITS in an amount of from about 1 wt. % to about 15 wt. % based on the total weight of solids, alternatively from about 1.5 wt. % to about 14 wt. % or alternatively from about 2 wt. % to about 12 wt. %.

In one or more embodiments, the BITS includes a viscosifier. Herein a viscosifier refers to a material that confers onto the wellbore servicing fluid (e.g., BITS) transport abilities, suspension capabilities and gelation properties. Nonlimiting examples of viscosifiers suitable for use in the present disclosure include gums such as diutan gum, xanthan gum, welan gum; cellulose derivatives; polyacrylic acid; polyacrylamide; crosslinked gums, activatable gums, synthetic organic polymers, acrylamidomethylpropane sulfonic acid, N,N-dimethylacrylamide; N-methylacrylamide; partially hydrolyzed polyacrylamide; poly 2-amino-2-methyl propane sulfonic acid; polyvinyl alcohol; sodium 2-acrylamido-2-methylpropane sulfonate; amphoteric/zwitterionic polymer, AMPS-DADMAC copolymers thereof and any combination thereof.

In one or more embodiments, the viscosifier is present in the BITS in an amount of from about 0.2 wt. % to about 10 wt. % based on the total weight of solids, alternatively from about 0.3 wt. % to about 9 wt. % or alternatively from about 0.5 wt. % to about 8 wt. %.

In one or more embodiments, the BITS may comprise additional materials as needed to meet some user and/or process goal. For example, the BITS may comprise a chelating agent able to sequester cations such as calcium. In one or more embodiments, the chelating agent is an organic acid. Nonlimiting examples of organic acids suitable for use as a chelating agent in the BITS include tartaric acid, citric acid, oxalic acid, gluconic acid, oleic acid, and uric acid. Examples of suitable organic acids are commercially available from Halliburton Energy Services, Inc., of Duncan, Okla., under the trade names HR®-25 cement retarder and Fe-2® agent.

A BITS of the type disclosed herein may further comprise a clay which imparts thermal viscosity and thermal stability and further enable the fluid to suspend the solid materials and prevent the solids from settling. Nonlimiting examples of clays suitable for use in the present disclosure include bentonite, attapulgite, kalonite, meta kalonite, laponite, hectorite and sepiolite. In one or more embodiments, the clay is present in the BITS in an amount of from about 2 wt. % to about 60 wt. %, alternatively from about 3 wt. % to about 50 wt. % or alternatively from about 5 wt. % to about 40 wt. % based on the total weight of the BITS.

In one or more embodiments, a method of the present disclosure comprises contacting the particulate material, multifunctional polymer, viscosifier, chelating agent and clay in any suitable order to form the BITS component of the WSF-BITS. For example, the particulate material may be contacted and mixed with the multifunctional polymer, viscosifier, chelating agent and clay to form a substantially homogenous mixture that is then used as the BITS component of the WSF-BITS.

Alternatively, the viscosifier may be contacted and mixed with the particulate material to form a substantially homogeneous mixture. The substantially homogeneous mixture may then be contacted and mixed with the multifunctional polymer to form another substantially homogeneous mixture to which is introduced a clay and chelating agent (in any order or concurrently). The resultant mixture may be suitably homogenized and then used as the BITS component of the WSF-BITS.

Alternatively, the viscosifier may be contacted and mixed with the multifunctional polymer to form a substantially homogenous mixture. The substantially homogenous mixture may then be contacted and mixed with the particulate material to form another substantially homogeneous mixture to which is introduced a clay and chelating agent (in any order or concurrently). The resultant mixture may be suitably homogenized and is then used as the BITS component of the WSF-BITS.

Alternatively, the viscosifier, multifunctional polymer and particulate material may be contacted and mixed to form a substantially homogeneous mixture to which is introduced a clay and chelating agent (in any order or concurrently). The resultant mixture may be suitably homogenized and then used as the BITS component of the WSF-BITS.

In one or more embodiments, a method of servicing a wellbore includes introducing a BITS of the type disclosed herein to a wellbore (e.g., pumping the BITS downhole). Alternatively, the BITS may be a component of a WSF that includes a base fluid, a weighting agent, a suspending agent and an emulsifier which is herein designated a WSF-BITS.

In one or more embodiments, a WSF-BITS of the type disclosed herein includes a base fluid, alternatively an aqueous base fluid. The aqueous portion of the aqueous base fluid may be fresh water. Alternatively, the water may be salt water, e.g., an unsaturated aqueous salt solution or a saturated aqueous salt solution such as brine or seawater.

In one or more embodiments, the WSF-BITS includes a sufficient amount of water to form a pumpable fluid. The water may be present in the WSF-BITS in an amount from about 25 wt. % to about 95 wt. %, alternatively from about 30 wt. % to about 90 wt. % or alternatively from about 35 wt. % to about 85 wt. % based on the total weight of WSF-BITS.

In one or more embodiments, the WSF-BITS includes a weighting agent. A weighting agent may function to produce a desired density in a fluid. Nonlimiting examples of weighting agents suitable for use in the present disclosure include barite, magnetite, iron oxides, illmenite, siderite, celestite, dolomite, olivine, calcite, magnesium oxides, halites and any combination thereof. In one or more embodiments, the weighting agent includes barite. For example, the weighting agent may include BARITE® heavyweight additive which is a barium sulfate material used to weight drilling muds and cement slurries that is commercially available from Halliburton Energy Services, Inc.

A weighting agent may be included in the WSF-BITS in an amount of from about 0 wt. % to about 90 wt. %, alternatively from about 1 wt. % to about 85 wt. % or from about 2 wt. % to about 80 wt. % based on the total weight of WSF-BITS.

In one or more embodiments, the WSF-BITS comprises an emulsifier. The emulsifier may function to lower the interfacial tension of the fluid, act as a degreaser, promote cement bonding and improve rheological compatibility between fluids. Emulsifiers that may be used in the fluids disclosed herein include, without limitation, fatty acids, soaps of fatty acids, amidoamines, polyamides, polyamines, oleate esters, such as sorbitan monoleate, sorbitan dioleate, imidazoline derivatives or alcohol derivatives, any combination thereof or derivatives thereof. An example of a commercially available emulsifier suitable for use in the present disclosure is SEM-8™ emulsifier commercially available from Halliburton Energy Services, Inc.

An emulsifier may be included in the WSF-BITS in an amount of from about 0.1 wt. % to about 10 wt. %, alternatively from about 0.2 wt. % to about 9 wt. % or alternatively from about 0.5 wt. % to about 8 wt. % based on the total weight of WSF-BITS.

In one or more embodiments, the WSF-BITS is characterized by a yield point of from about 5 lbf/100 ft$^2$ to about 50 lbf/100 ft², alternatively from about 5 lbf/100 ft² to about 45 lbf/100 ft² or alternatively from about 7 lbf/100 ft² to about 40 lbf/100 ft² at a temperature in the range of from about 40° F. to about 400° F., alternatively from about 45° F. to about 375° F. or alternatively from about 50° F. to about 350° F. Herein the yield point ("YP") is defined as the value obtained from the Bingham-Plastic rheological model when extrapolated to a shear rate of zero. As used herein, the "yield point" of a fluid (e.g., WSF-BITS) is calculated as the difference between the plastic viscosity and the 300 rpm dial reading, expressed in psi.

In one or more embodiments, a WSF-BITS may be introduced to a formation experiencing a well-ballooning event. A WSF-BITS of the type disclosed herein may also be utilized as a spacer fluid, In such embodiments, in addition to displacing drilling fluid from the wellbore (i.e., functioning as a spacer fluid), a portion of the WSF-BITS may enter the pervious zone and form a mass that mitigates the effects of well ballooning. Additional fluids such as cements may be circulated into place behind the WSF-BITS.

For example, a cement composition may be conveyed downhole and up through the annulus to the trapped wellbore fluid. The cement composition may set into a hard mass, which may form a cement column that isolates an adjacent portion of the subterranean formation and provides support to the adjacent conduit. In one or more embodiments, the cement sheath is placed into a location proximate to the pervious zone. A WSF-BITS of the type disclosed herein may prevent the influx of fluid from the formation into the cement that would compromise the structural integrity of the cement sheath.

A cement sheath placed into a wellbore subsequent to use of WSF-BITS of the type disclosed herein has a structural integrity greater than an otherwise similar cement sheath formed without the prior introduction of a WSF-BITS fluid to the wellbore. For example, logging methods may be used to determine cement sheath coverage and position/depth in well and a comparison made between the well logs of a wellbore having a cement sheath comprising a WSF-BITS and a cement sheath without a WSF-BITS. In one or more embodiments, a comparison between a cement sheath formed with a WSF-BITS and one formed in the absence of the WSF-BITS may be made utilizing acoustic impedance. Acoustic impedance refers to the use acoustic logs which do not measure cement quality directly; rather, this value is inferred from the degree of acoustic coupling of the cement to the casing and to the formation. Generally, a well in which sheath integrity is improved would exhibit higher acoustic impedance compared with a well having compromised cement sheath integrity as ballooning is a factor that would compromise sheath integrity.

EXAMPLES

The subject matter of the present disclosure having been generally described, the following examples are given as particular embodiments thereof and to demonstrate the practice and advantages thereof. It is understood that the examples are given by way of illustration and are not intended to limit the specification or the claims in any manner.

Example 1

A BITS of the type disclosed herein (600 ml) was prepared, to have the formulation described in Table 1. The ability of the BITS to function as fluid loss agent and to form a stable filter cake was investigated. To check the integrity of a plug (filter cake) formed by the BITS and the ability of the BITS to minimize the flow of wellbore fluid into the formation, a permeability plugging apparatus (PPA) was used. A PPA is a high pressure, high temperature filtration device designed to evaluate fluid loss and spurt loss of fluids under filtration conditions that closely approximates those encountered downhole. In this test set up; first a fluid loss test was performed and then a filter cake integrity test was carried out.

The fluid loss test was carried out in accordance with API-RP-13B. Specifically, after mixing the spacer (as per the formulation given in Table 1), 275 ml was poured into a PPA cell and a 500 micron slot was placed on top of the spacer fluid. The fluid loss test was performed at differential pressure of 1000 psi that was achieved by applying 1200 psi pressure from the bottom of the cell and by applying 200 psi from top of the cell. Both these pressures were monitored on the supply pressure gauge and back pressure gauge, respectively. The test duration was 30 min during which the fluid loss was collected in the receiver placed above the heating jacket and a filter cake was formed to plug the 500 micron slot. After completion of the test, the pressure from both ends was slowly released. The receiver was opened and cleaned. Then it was replaced and used for filter cake integrity test.

The filter cake integrity test was carried out by applying pressure from the back pressure valve (i.e. from the opposite direction of filter cake formed) which was monitored on a back pressure gauge. If the filter cake integrity was good then this back pressure would not be transmitted through the filter cake and nothing would be seen on supply pressure gauge and vice versa. Three tests (denoted 1, 2, and 3 respectively) were carried using this procedure.

In the first filter cake integrity test, Test 1, a cement slurry was poured in the fluid loss receiver and then 1000 psi back pressure was applied. The cement slurry represents the wellbore/formation fluid available in the formation. In the second filter cake integrity test, Test 2, nothing was poured in the receiver and the filter cake was directly exposed to the pressure by applying 1000 psi back pressure. In the third filter cake integrity test, Test 3, Test 2 was repeated using 900 psi back pressure. The results of these tests are presented in Table 2.

TABLE 1

| Materials | Quantity (g) |
|---|---|
| BITS | 54 |
| SA-1015 | 0.36 |
| SEM-8 | 12 |
| Barite | 203.6 |
| Water | 510.1 |

TABLE 2

| Test # | Pressure applied from back side (psi) | Pressure on Supply pressure gauge (psi) | Conclusion |
|---|---|---|---|
| 1 | 1000 | 0 | Filter cake withstands 1000 psi pressure |
| 2 | 1000 | 1000 | Filter cake doesn't withstand 1000 psi |
| 3 | 900 | 0 | Filter cake withstands 900 psi pressure |

The results demonstrate a BITS of the type disclosed herein was found to form a stable filter cake that had sufficient structural integrity to inhibit fluid loss.

Example 2

The regain permeability was investigated at room temperature using a BITS of the type disclosed herein having a density of 8.8 lbm/gal (without weighting agent). The BITS included 45 lb/bbl of the formulation of Table 1, as well as 1 gal/bbl DSS-B additive and 0.5 gal/bbl SEM-8™ emulsifier. Testing was performed using "formation response tester" equipment available from Baroid. The core used was Berea sandstone of two different permeabilities. ISOPAR-L oil at a flow rate of 3 mL/min was used to determine the initial and return (aka regain) permeability of the cores. After determining the initial permeability, the spacer system was injected at a rate of 10 mL/min until the maximum differential pressure of 700 psi was achieved. Constant pressure was applied at the differential pressure for 30 minutes. Then, the regain permeability of the core was determined. DSS-B additive is a water-soluble surfactant package and 0.5 gal/bbl SEM-8™ emulsifier that are both commercially available from Halliburton Energy Services, Inc. ISOPAR™ L isoparaffinic hydrocarbon solvent is an industrial solvent commercially available form ExxonMobil.

TABLE 3

| Parameter | Test 1 | Test 2 |
| --- | --- | --- |
| Initial permeability (md) | 1420 | 5170 |
| Regain permeability (md) | 1230 | 4940 |
| % Regain permeability | 87 | 95 |

A BITS of the type disclosed herein was found to inhibit fluid loss while maintaining a high degree of permeability to oil flow.

Additional Disclosure

The following are additional enumerated embodiments of the concepts disclosed herein.

A first embodiment which is a method of servicing a wellbore in a formation comprising circulating in the wellbore a wellbore servicing fluid wherein the equivalent circulating density of the wellbore servicing fluid is from about 1% to about 15% greater than a fracture pressure of the formation; and introducing to the wellbore a balloon-inhibiting tunable spacer (BITS) fluid at least about 1 wt. % of the BITS fluid is retained by the formation.

A second embodiment which is the method of the first embodiment further comprising determining a regain permeability of the formation.

A third embodiment which is the method of the second embodiment wherein the regain permeability is from about 50% to about 100%.

A fourth embodiment which is the method of any of the first through the third embodiments wherein the wellbore servicing fluid comprises a drilling fluid.

A fifth embodiment which is the method of any of the first through the fourth embodiments wherein the equivalent circulating density of the wellbore servicing fluid ranges from about 8.5 lb/gal to about 20 lb/gal.

A sixth embodiment which is the method of any of the first through the fifth embodiments wherein the balloon-inhibiting tunable spacer fluid comprises a particulate material, a multifunctional polymer, and a viscosifier.

A seventh embodiment which is the method of the sixth embodiment wherein the particulate material has a particle size distribution of from about 0.5 micron to about 5 mm.

An eighth embodiment which is the method of any of the sixth through the seventh embodiments wherein the particulate material comprises inorganic particles, carbonate-containing particles, polymeric materials, elastomeric materials or any combination thereof.

A ninth embodiment which is the method of any of the sixth through the eighth embodiments wherein the particulate material is selected from the group consisting of silica (sand), graded sand, Ottawa sands, Brady sands, Colorado sands; gravels; synthetic organic particles, nylon pellets, high density plastics, polytetrafluoroethylenes, rubbers, resins; ceramics, aluminosilicates; glass; sintered bauxite; quartz; aluminum pellets; ground or crushed shells of nuts, walnuts, pecans, almonds, ivory nuts, brazil nuts, and the like; ground or crushed seed shells of seeds of fruits; ground or crushed seed shells of other plants; crushed fruit pits or processed wood materials, materials derived from woods; graphite, petroleum coke, rubber particles, coal and any combination thereof.

A tenth embodiment which is the method of any of the sixth through the ninth embodiments wherein the polymer is selected from the group consisting of an anionic polymer, a cationic polymer, a non-ionic polymer, an amphoteric polymer and any combination thereof.

An eleventh embodiment which is the method of any of the sixth through the tenth embodiments wherein the polymer is selected from the group consisting of a polyacrylamide, a polyacrylamide derivative, a polyacrylamide co-polymer, a N-N dimethylacrylamide-AMPS-Acryloylmorpholine terpolymer, N-N dimethylacrylamide-AMPS-vinyl pyrollidone terpolymer, tannin-grafted AMPS, lignite-grafted AMPS-acrylonitrile-acrylamide terpolymer, humate-grafted AMPS-diallyldimethylammonium chloride and any combination thereof.

A twelfth embodiment which is the method of any of the sixth through the eleventh embodiments wherein the viscosifier is selected from the group consisting of diutan gum, xanthan gum, welan gum, cellulose derivatives, polyacrylic acid, polyacrylamide, copolymers thereof and any combination thereof.

A thirteenth embodiment which is the method of any of the sixth through the twelfth embodiments wherein the particulate material is present in the BITS fluid in an amount of from about 40 wt. % to about 90 wt. % based on the total weight of solids.

A fourteenth embodiment which is the method of any of the sixth through the thirteenth embodiments wherein the viscosifier is present in the BITS fluid in an amount of from about 0.2 wt. % to about 5 wt. % based on the total weight of solids.

A fifteenth embodiment which is the method of any of the sixth through the fourteenth embodiments wherein the multifunctional polymer is present in the BITS fluid in an amount of from about 1 wt. % to about 15 wt. % based on the total weight of solids.

A sixteenth embodiment which is the method of any of the sixth through the fifteenth embodiments wherein the BITS fluid has a yield point of from about 5 psi to about 40 psi at a temperature of from about 50° F. to about 400° F.

A seventeenth embodiment which is the method of any of the sixth through the sixteenth embodiments wherein the BITS further comprises a chelating agent and a clay.

An eighteenth embodiment which is the method of the seventeenth embodiment wherein the chelating agent is selected from the group consisting of tartaric acid, citric acid, oxalic acid, gluconic acid, oleic acid, uric acid and any combination thereof.

A nineteenth embodiment which is the method of the seventeenth embodiment wherein the clay is selected from the group consisting of bentonite, attapulgite, kalonite, meta kalonite, laponite, hectorite, sepiolite and any combination thereof.

A twentieth embodiment which is the method of any of the first through the nineteenth embodiments further comprising introducing to the wellbore a cementitious wellbore servicing fluid and allowing the cementititious wellbore servicing fluid to set into a cement sheath wherein the cement sheath has a structural integrity greater than an otherwise similar cement sheath formed without the prior introduction of a BITS fluid to the wellbore.

A twenty-first embodiment which is a method of servicing a wellbore experiencing ballooning comprising introducing to the wellbore a balloon-inhibiting tunable spacer (BITS) fluid comprising a particulate material, a multifunctional polymer, a viscosifier, a clay and a chelating agent wherein at least about 1 wt. % of the BITS fluid is retained by the formation.

A twenty-second embodiment which is the method of the twenty-first embodiment further comprising evaluating an effect of the BITS fluid on the ballooning.

A twenty-third embodiment which is the method of the twenty-second embodiment wherein evaluating the effect of the BITS fluid on ballooning comprises (i) shutting the wellbore at a surface and monitoring a well pressure; (ii) stopping a pumping of fluids to the wellbore and monitoring of a return flow rate; (iii) measuring a downhole temperature at a depth of a pervious zone or (iv) any combination thereof.

A twenty-forth embodiment, which is a balloon-inhibiting spacer (BITS) fluid as described in any of the first through twenty-third embodiments.

While embodiments of the disclosed subject matter have been shown and described, modifications thereof can be made by one skilled in the art without departing from the spirit and teachings of the disclosed subject matter. The embodiments described herein are exemplary only, and are not intended to be limiting. Many variations and modifications of the disclosed subject matter are possible and are within the scope of the disclosed subject matter. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprising, includes, having, etc. should be understood to provide support for narrower terms such as consisting of, consisting essentially of, consisting substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosed subject matter. Thus, the claims are a further description and are an addition to the embodiments of the presently disclosed subject matter. The discussion of a document herein is not an admission that it is prior art to the presently disclosed subject matter, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a formation comprising:
    circulating in the wellbore a wellbore servicing fluid wherein an equivalent circulating density of the wellbore servicing fluid is from about 1% to about 15% greater than a fracture pressure of the formation;
    introducing to the wellbore a balloon-inhibiting tunable spacer (BITS) fluid, wherein at least about 1 wt. % of the BITS fluid is retained by the formation and
    wherein a reduction in well ballooning is achieved as indicated by (i) a well pressure that is about zero; (ii) a return flow rate of about zero; (iii) a downhole temperature at a depth of a pervious zone remains about constant or (iv) any combination thereof.

2. The method of claim 1 further comprising determining a regain permeability of the formation.

3. The method of claim 2 wherein the regain permeability is from about 50% to about 100%.

4. The method of claim 1 wherein the equivalent circulating density of the wellbore servicing fluid ranges from about 8.5 lb/gal to about 20 lb/gal.

5. The method of claim 1 wherein the BITS fluid comprises a particulate material, a multifunctional polymer, and a viscosifier.

6. The method of claim 5 wherein the particulate material has a particle size distribution of from about 0.5 micron to about 5 mm.

7. The method of claim 5 wherein the particulate material comprises inorganic particles, carbonate-containing particles, polymeric materials, elastomeric materials or any combination thereof.

8. The method of claim 5 wherein the particulate material is selected from the group consisting of silica, graded sand, Ottawa sands, Brady sands, Colorado sands; gravels; synthetic organic particles, nylon pellets, high density plastics, polytetrafluoroethylenes, rubbers, resins; ceramics, aluminosilicates; glass; sintered bauxite; quartz; aluminum pellets; ground or crushed shells of nuts, walnuts, pecans, almonds, ivory nuts, and brazil nuts; ground or crushed seed shells of seeds of fruits; ground or crushed seed shells of other plants; crushed fruit pits or processed wood materials, materials derived from woods; graphite, petroleum coke, rubber particles, coal and any combination thereof.

9. The method of claim 5 wherein the multifunctional polymer is selected from the group consisting of a polyacrylamide, a polyacrylamide derivative, a polyacrylamide co-polymer, a N-N dimethylacrylamide-AMPS-acryloylmorpholine terpolymer, N-N dimethylacrylamide-AMPS-vinyl pyrollidone terpolymer, tannin-grafted AMPS, lignite-grafted AMPS-acrylonitrile-acrylamide terpolymer, humate-grafted AMPS-diallyldimethylammonium chloride and any combination thereof.

10. The method of claim 5 wherein the viscosifier is selected from the group consisting of diutan gum, xanthan gum, welan gum, cellulose derivatives, polyacrylic acid, polyacrylamide, copolymers thereof and any combination thereof.

11. The method of claim 5 wherein the particulate material is present in the BITS fluid in an amount of from about 40 wt. % to about 90 wt. % based on the total weight of solids.

12. The method of claim 5 wherein the viscosifier is present in the BITS fluid in an amount of from about 0.2 wt. % to about 5 wt. % based on the total weight of solids.

13. The method of claim 5 wherein the multifunctional polymer is present in the BITS fluid in an amount of from about 1 wt. % to about 15 wt. % based on the total weight of solids.

14. The method of claim 5 wherein the BITS fluid further comprises a chelating agent and a clay.

15. The method of claim 14 wherein the chelating agent is selected from the group consisting of tartaric acid, citric acid, oxalic acid, gluconic acid, oleic acid, uric acid and any combination thereof.

16. The method of claim 14 wherein the clay is selected from the group consisting of bentonite, attapulgite, kalonite, meta kalonite, laponite, hectorite, sepiolite and any combination thereof.

17. The method of claim 1 further comprising introducing to the wellbore a cementitious wellbore servicing fluid and allowing the cementititious wellbore servicing fluid to set into a cement sheath wherein the cement sheath has a structural integrity greater than a cement sheath formed without a prior introduction of the BITS fluid to the wellbore.

18. A method of servicing a wellbore experiencing ballooning comprising:
introducing to the wellbore a balloon-inhibiting tunable spacer (BITS) fluid comprising a particulate material, a multifunctional polymer, a viscosifier, a clay and a chelating agent, wherein at least about 1 wt. % of the BITS fluid is retained by the formation and
wherein a reduction in well ballooning is achieved as indicated by (i) a well pressure that is about zero; (ii) a return flow rate of about zero; (iii) a downhole temperature at a depth of a pervious zone remains about constant or (iv) any combination thereof.

19. The method of claim 18 further comprising determining a regain permeability of the formation.

20. The method of claim 18 wherein the BITS fluid has a yield point of from about 5 lbf/100 ft$^2$ to about 50 lbf/100 ft$^2$ at a temperature in the range of from about 40° F. to about 400° F.

* * * * *